United States Patent
Lee et al.

(10) Patent No.: US 12,107,261 B2
(45) Date of Patent: Oct. 1, 2024

(54) NEGATIVE ELECTRODE ACTIVE MATERIAL FOR LITHIUM SECONDARY BATTERY AND METHOD FOR PREPARING THE SAME

(71) Applicant: LG CHEM, LTD., Seoul (KR)

(72) Inventors: Su-Min Lee, Daejeon (KR); Je-Young Kim, Daejeon (KR); Il-Geun Oh, Daejeon (KR); Yong-Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 186 days.

(21) Appl. No.: 16/646,405

(22) PCT Filed: May 3, 2019

(86) PCT No.: PCT/KR2019/005375
§ 371 (c)(1),
(2) Date: Mar. 11, 2020

(87) PCT Pub. No.: WO2019/225879
PCT Pub. Date: Nov. 28, 2019

(65) Prior Publication Data
US 2020/0274147 A1  Aug. 27, 2020

(30) Foreign Application Priority Data
May 24, 2018  (KR) .................. 10-2018-0059234

(51) Int. Cl.
*H01M 4/36* (2006.01)
*H01M 4/485* (2010.01)
(Continued)

(52) U.S. Cl.
CPC ........... *H01M 4/362* (2013.01); *H01M 4/485* (2013.01); *H01M 4/621* (2013.01); *H01M 4/625* (2013.01);
(Continued)

(58) Field of Classification Search
None
See application file for complete search history.

(56) References Cited

U.S. PATENT DOCUMENTS

2005/0186475 A1   8/2005  Jeong et al.
2006/0040182 A1   2/2006  Kawakami et al.
(Continued)

FOREIGN PATENT DOCUMENTS

CN   101153358 A   4/2008
CN   101609891 A   12/2009
(Continued)

OTHER PUBLICATIONS

International Search Report (PCT/ISA/210) issued in PCT/KR2019/005375, mailed on Aug. 21, 2019.
(Continued)

*Primary Examiner* — Zhongqing Wei
(74) *Attorney, Agent, or Firm* — Birch, Stewart, Kolasch & Birch, LLP

(57) ABSTRACT

A negative electrode active material for a lithium secondary battery including complex particles including silicon oxide particles doped with a metal of lithium, magnesium, calcium or aluminum, a linear conductive material disposed between the doped silicon oxide particles, and a carbon-based binder that binds the doped silicon oxide particles and the conductive material together. The carbon-based binder is a result of sintering a carbon-based precursor. A method of preparing the negative electrode active material, a negative electrode and a lithium secondary battery are also provided. The
(Continued)

negative electrode active material according to the present disclosure is superior at least in initial efficiency and life characteristics.

16 Claims, 1 Drawing Sheet

(51) Int. Cl.
  *H01M 4/62* (2006.01)
  *H01M 10/0525* (2010.01)
  *H01M 4/02* (2006.01)

(52) U.S. Cl.
  CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2006/0166098 A1* | 7/2006 | Tabuchi | H01M 4/364 |
| | | | 429/232 |
| 2007/0243469 A1 | 10/2007 | Kim et al. | |
| 2009/0029256 A1 | 1/2009 | Mah et al. | |
| 2012/0328923 A1 | 12/2012 | Sawai et al. | |
| 2013/0108927 A1* | 5/2013 | Wang | H01M 4/13 |
| | | | 977/948 |
| 2014/0154578 A1 | 6/2014 | Yoo et al. | |
| 2014/0234535 A1 | 8/2014 | Lee et al. | |
| 2016/0087267 A1 | 3/2016 | Yoshio et al. | |
| 2016/0285091 A1* | 9/2016 | Iriyama | H01M 4/0459 |
| 2016/0372753 A1 | 12/2016 | Fukasawa et al. | |
| 2017/0069909 A1* | 3/2017 | Eom | H01M 4/625 |
| 2017/0117542 A1 | 4/2017 | Park et al. | |
| 2018/0083272 A1 | 3/2018 | Son et al. | |
| 2018/0090750 A1* | 3/2018 | Oh | H01M 4/364 |
| 2018/0342757 A1 | 11/2018 | Choi et al. | |

FOREIGN PATENT DOCUMENTS

| | | | | |
|---|---|---|---|---|
| CN | 102646818 | A | 8/2012 | |
| CN | 102891297 | A | 1/2013 | |
| CN | 103094533 | A | 5/2013 | |
| CN | 108560234 | A | 2/2014 | |
| CN | 106711461 | A | 6/2017 | |
| CN | 107848810 | A | 3/2018 | |
| EP | 2755263 | A1 * | 7/2014 | ............ B82Y 30/00 |
| JP | 2005-19399 | A | 1/2005 | |
| JP | 2010-135336 | A | 6/2010 | |
| JP | 5406799 | B2 | 2/2014 | |
| JP | 2016-62860 | A | 4/2016 | |
| JP | 2018-67555 | A | 4/2018 | |
| KR | 10-2005-0087148 | A | 8/2005 | |
| KR | 10-2007-0102881 | A | 10/2007 | |
| KR | 10-0578870 | B1 | 5/2008 | |
| KR | 10-1560892 | B1 | 10/2015 | |
| KR | 10-2015-0128432 | A | 11/2015 | |
| KR | 10-2016-0002281 | A | 1/2016 | |
| KR | 10-2017-0048184 | A | 5/2017 | |
| KR | 10-2018-0031566 | A | 3/2018 | |
| KR | 10-1837347 | B1 | 3/2018 | |

OTHER PUBLICATIONS

Kim et al., "Facile Synthesis of Carbon-Coated Silicon/Graphite Spherical Composites for High-Performance Lithium-Ion Batteries", ACS Appl. Mater. Interfaces 2016, vol. 8, pp. 12109-12117.
Extended European Search Report for European Application No. 19806561.7, dated Nov. 19, 2020.

* cited by examiner

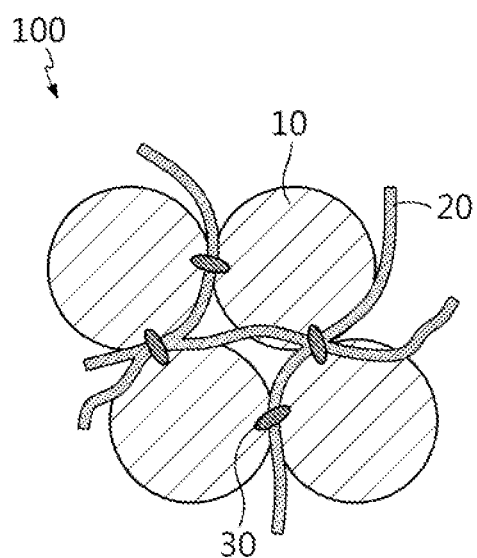

NEGATIVE ELECTRODE ACTIVE MATERIAL FOR LITHIUM SECONDARY BATTERY AND METHOD FOR PREPARING THE SAME

TECHNICAL FIELD

The present application claims the benefit of Korean Patent Application No. 10-2018-0059234 filed on May 24, 2018 with the Korean Intellectual Property Office, the disclosure of which is incorporated herein by reference in its entirety.

The present disclosure relates to a negative electrode active material for a lithium secondary battery and a method for preparing the same, and more particularly, to a negative electrode active material for a lithium secondary battery with high initial efficiency and long life characteristics and a method for preparing the same.

BACKGROUND ART

With the technology development and growing demand for mobile devices, the demand for secondary batteries as an energy source dramatically increases. In secondary batteries, lithium secondary batteries are widely used in commercial applications due to their high energy density and voltage, long cycle life, and low discharge rate.

A lithium secondary battery has a structure in which an electrode assembly including a positive electrode and a negative electrode, each having an active material applied on an electrode current collector, with a porous separator interposed between, is impregnated with an electrolyte containing a lithium salt, and the electrode is manufactured by applying, to a current collector, a slurry containing an active material, a binder and a conductive material dispersed in a solvent, followed by drying and pressing.

Additionally, the basic performance characteristics of the lithium secondary battery, namely, capacity, output and life, are greatly influenced by the negative electrode material. For maximum battery performance, the negative electrode active material needs to satisfy the requirements that the electrochemical reaction potential should be close to lithium metal, reaction reversibility with lithium ions should be high and diffusion of lithium ions in the active material should be fast, and a carbon-based material is widely used as a material satisfying these requirements.

The carbon-based active material is good at stability and reversibility, but has capacity limitation. Accordingly, recently, Si-based materials having high theoretical capacity are applied as a negative electrode active material in the field of industry requiring high capacity batteries, for example, electric vehicles and hybrid electric vehicles.

However, Si particles change in crystal structure when lithium ions are intercalated during charging, and involve volume expansion such that the volume is about 4 times larger than that before lithium intercalation. Accordingly, Si particles do not withstand the volume changes in the repeated charging/discharging and are cracked in the crystals and broken, electrical connection between adjacent particles reduces, and eventually the life characteristics degrade.

Accordingly, studies have been made to improve the life characteristics using silicon oxide ($SiO_x$) and reduce the volume expansion, but because silicon oxide forms an irreversible phase when lithium is intercalated, as lithium is consumed, the initial efficiency is low and the life characteristics degrade.

DISCLOSURE

Technical Problem

The present disclosure is designed to solve the above-described problem, and therefore the present disclosure is directed to providing a silicon oxide-based negative electrode active material with improved initial efficiency and life characteristics and a method for preparing the same.

The present disclosure is further directed to providing a negative electrode including the negative electrode active material and a lithium secondary battery including the same.

Technical Solution

According to an aspect of the present disclosure, there is provided a negative electrode active material for a lithium secondary battery including complex particles including silicon oxide particles doped with at least one metal selected from a group consisting of lithium, magnesium, calcium and aluminum, a linear conductive material disposed between the doped silicon oxide particles, and a carbon-based binder that binds the doped silicon oxide particles and the linear conductive material together, wherein the carbon-based binder is a result of sintering a carbon-based precursor.

The silicon oxide may be represented by $SiO_x (0<x\leq2)$.

An amount of the metal doped in the silicon oxide may be 1 weight % to 50 weight % based upon a total weight of the silicon oxide.

The doped silicon oxide particles may have an average particle diameter of 1 μm to 6 μm.

The complex particles may have an average particle diameter of 3 μm to 12 μm.

The carbon-based precursor may be pitch.

The linear conductive material may be carbon nanotube (CNT), graphene or carbon black.

Each of the carbon-based binder and the linear conductive material may be present in an amount of 1 to 30 parts by weight based on 100 parts by weight of the doped silicon oxide.

According to another aspect of the present disclosure, there is provided a method for preparing a negative electrode active material for a lithium secondary battery, including mixing silicon oxide particles with metal powder of at least one metal selected from the group consisting of lithium, magnesium, calcium and aluminum and, then, performing heat treatment to dope the silicon oxide particles; and mixing the doped silicon oxide particles with a carbon-based precursor and a linear conductive material, and, then, performing sintering to form the doped silicon oxide particles and the linear conductive material into a complex comprising a carbon-based binder as a result of sintering the carbon-based precursor.

The heat treatment in the doping may be performed at a temperature of from 800° C. to 1.050° C.

The sintering in the forming into a complex may be performed at a temperature of from 700° C. to 1,100° C.

According to still another aspect of the present disclosure, there is provided a negative electrode including a current collector, and a negative electrode active material layer disposed on at least one surface of the current collector, wherein the negative electrode active material layer includes the negative electrode active material for a lithium secondary battery as mentioned above.

In addition, there is provided a lithium secondary battery including the negative electrode.

Advantageous Effects

The negative electrode active material according to an aspect of the present disclosure includes doped silicon oxide, and a carbon-based binder binds particles of the doped silicon oxide and a linear conductive material between the particles together to minimize the gaps caused by the volume expansion of silicon oxide, and even though gaps are generated, the linear conductive material serves as a bridge filling the gaps, thereby enhancing the initial efficiency and life characteristics.

BRIEF DESCRIPTION OF DRAWINGS DRAWING

The accompanying drawing illustrates a preferred embodiment of the present disclosure and, together with the foregoing disclosure, serve to provide a further understanding of the technical aspects of the present disclosure. However, the present disclosure is not to be construed as being limited to the drawings.

The FIGURE shows the structure of a negative electrode active material for a lithium secondary battery according to an embodiment of the present disclosure.

BEST MODE

Hereinafter, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A negative electrode active material for a lithium secondary battery according to an embodiment of the present disclosure includes complex particles including doped silicon oxide, a linear conductive material and a carbon-based binder, and The FIGURE illustrates the structure of the negative electrode active material for a lithium secondary battery of the present disclosure.

Referring to The FIGURE, the negative electrode active material 100 for a lithium secondary battery of the present disclosure includes complex particles in which doped silicon oxide 10 is in the form of secondary particles resulting from the aggregation of primary particles, the linear conductive material 20 and the carbon-based binder 30 are disposed between the particles of the doped silicon oxide 10, and the carbon-based binder 30 binds the particles of the doped silicon oxide 10 and the linear conductive material 20 together.

In an embodiment of the present disclosure, the doped silicon oxide refers to silicon oxide doped with at least one metal of lithium, magnesium, calcium and aluminum to overcome the drawback of silicon oxide having low initial efficiency.

Silicon oxide generally represented by $SiO_x(0<x\leq 2)$ includes a nanocomposite structure of $SiO_2$ alone or a mixture of Si and $SiO_2$, and its composition x may be determined by a ratio of silicon and oxygen. For example, when $Si:SiO_2$ are mixed at a mole ratio of 1:1 in the $SiO_x(0<x\leq 2)$, SiO (x=1) may be represented.

When silicon oxide of $SiO_x(0<x\leq 2)$ is applied as a negative electrode active material of a lithium secondary battery, Si included in silicon oxide substantially causes electrochemical reactions by intercalation and deintercalation of lithium ions separated from a positive electrode active material in the charging reaction of the lithium secondary battery. In this instance, irreversible reaction whereby lithium compounds not contributing to the charging/discharging are generated may occur in the initial charge. As a result, it is known that initial efficiency of the lithium secondary battery including silicon oxide as the negative electrode active material is low.

To overcome this problem, the present disclosure uses silicon oxide doped with at least one metal component of lithium, magnesium, calcium and aluminum. For example, when silicon oxide is doped with the metal component, the metal is bonded to the oxygen-containing Si compound ($SiO$, $SiO_2$, $SiO_x$) part and causes irreversible reactions first. In this state, when charging is performed, lithium ions intercalated into the negative electrode are bonded to Si, and when discharging is performed, the lithium ions are deintercalated, and thus, the initial irreversible reactions of silicon oxide reduce, resulting in improved initial efficiency. Additionally, this improved initial efficiency reduces an amount of lithium ions bonded to Si during discharging of a full cell and regulates the operating potential of the negative electrode, and eventually, reduces the volume change of Si, resulting in improved life characteristics.

An amount of at least one of lithium, magnesium, calcium and aluminum doped in the silicon oxide may be 1 to 50 weight %, particularly 2 to 30 weight %, more particularly 3 to 20 weight % for appropriate initial efficiency and enhanced life characteristics.

In an embodiment of the present disclosure, the particles of the doped silicon oxide may have the average particle diameter of 1 to 6 μm. For example, the average particle diameter of the doped silicon oxide particles may range between the lower limit and the upper limit, with the lower limit being 1 μm or 1.5 μm, and the upper limit being 6 μm or 3 μm. When the particle size is too small, side reactions increase, and when the particle size is too large, the particles may be cracked during charging/discharging, and thus it is advantageous when the particle size satisfies the above range. To control the particle size, pulverization and sieving may be performed on the doped silicon oxide. In this instance, the average particle diameter of the particles may be determined by methods commonly used in the art, for example, laser diffraction particle size distribution measurement.

In an embodiment of the present disclosure, the linear conductive material is used to overcome the problem that silicon particles contained in silicon oxide cannot withstand a volume change as charging/discharge repeats, cracks occur in the crystals, the particles break, and electrical connection between adjacent particles reduces and life characteristics degrade.

The linear conductive material refers to a conductive material such that a single material or a result of agglomeration has a large aspect ratio (length/diameter), for example, an aspect ratio of 50 to 500. Additionally, the linear conductive material may have an average diameter of 1 to 200 nm and an average length of 100 nm to 5 μm. The linear conductive material is disposed between the doped silicon oxide particles to give conductivity so that electrical connection between the particles is maintained. And, the linear conductive material serves as a bridge filling the gaps caused by the volume expansion of silicon oxide during charging/discharging, contributing to the structure maintenance of the complex particles, thereby improving the life characteristics.

The linear conductive material such that a single material has the aspect ratio may be carbon nanotube (CNT) and graphene, and the linear conductive material such that a result of agglomeration has the aspect ratio may be carbon black.

Additionally, the linear conductive material may be present in an amount of 1 to 30, particularly 3 to 15 parts by weight based on 100 parts by weight of the doped silicon oxide. When the above range is satisfied, it is possible to establish sufficient electrical connection between adjacent particles and minimize side reactions with an electrolyte solution, thereby preventing the reduction in initial efficiency and life characteristics.

In an embodiment of the present disclosure, the carbon-based binder is disposed between the doped silicon oxide particles while being in point contact with the silicon oxide particles and the linear conductive material, and serves as a binder to bind them together into a complex.

That is, the complex particles of the negative electrode active material according to the present disclosure have enhanced bonds between adjacent doped silicon oxide particles by the carbon-based binder, thereby minimizing the gaps even though cracks occur due to volume expansion. Further, the linear conductive material is bonded with the silicon oxide particles together at the same time, suppressing structural changes, and when gaps are created between the silicon oxide particles or in the particles, the linear conductive material having a large aspect ratio connects the gaps, thereby preventing the reduction in electrical conductivity, and leading to much more improved life characteristics.

The carbon-based binder may be a result of sintering a carbon-based precursor, and the carbon-based precursor may be pitch.

Additionally, the carbon-based binder may be present in an amount of 1 to 30, particularly 3 to 15 parts by weight based on 100 parts by weight of the doped silicon oxide. When the above range is satisfied, it is possible to give sufficient bondability and conductivity and prevent the initial efficiency reduction.

In the present disclosure, the amount of the carbon-based binder may be calculated by subtracting the sum of the weight of the doped silicon oxide and the weight of the linear conductive material from the total weight of the complex particles.

As described above, the complex particles of the present disclosure, in which the silicon oxide particles are bonded with the linear conductive material therebetween together by the medium of the carbon-based binder, may have the average particle diameter of 3 to 12 µm. For example, the average particle diameter of the complex particles may range between the lower limit and the upper limit, with the lower limit being 3 µm, 5 µm or 7 µm, and the upper limit being 12 µm or 10 µm.

The complex particles of the present disclosure are 2 to 5 times, particularly 2 to 4 times larger in size than the doped silicon oxide particles. Here, the size ratio of the complex particles to the doped silicon oxide particles may be calculated by dividing the average particle diameter of the complex particles by the average particle diameter of the doped silicon oxide.

That is, the negative electrode active material according to an embodiment of the present disclosure include the doped silicon oxide particles agglomerated on a small scale, not a large scale like bunch of grapes, and this is advantageous in terms of processing since the structure is maintained even after coating and pressing.

Another embodiment of the present disclosure relates to a method for preparing the negative electrode active material for a lithium secondary battery as described above, and in detail, the method includes the following steps:
 (S1) mixing silicon oxide particles with metal powder of lithium, magnesium, calcium or aluminum and performing heat treatment to dope the silicon oxide particles; and
 (S2) mixing the doped silicon oxide particles with a linear conductive material and a carbon-based precursor and performing sintering.

In the step S1, heat treatment may be performed at 800 to 1050° C., particularly 900 to 1000° C., taking into account the melting point and the boiling point of the metal component used for silicon oxide doping. That is, the heat treatment temperature is selected as a suitable temperature so that after silicon oxide is mixed with at least one metal powder of lithium, magnesium, calcium and aluminum, the metal components do not evaporate and can be dissolved and impregnated into the silicon oxide. Additionally, the heat treatment may be performed, for example, for 1 to 3 hours.

Meanwhile, an amount of at least one metal powder of lithium, magnesium, calcium and aluminum may be 1 to 50 weight %, particularly 2 to 30 weight %, particularly 3 to 20 weight % relative to the silicon oxide to provide a sufficient initial efficiency improvement effect without a great reduction in discharge capacity.

The step S2 is a process in which the doped silicon oxide particles and the linear conductive material are formed into a complex by the carbon-based binder. That is, through the sintering process after mixing the doped silicon oxide particles with the carbon-based precursor and the linear conductive material, the carbon-based binder as a result of sintering the carbon-based precursor binds the doped silicon oxide particles and the linear conductive material to produce complex particles.

In the step S2, the linear conductive material may be used in an amount of 1 to 30, particularly 3 to 15 parts by weight based on 100 parts by weight of the doped silicon oxide. Additionally, the carbon-based precursor may be used in an amount of 1 to 30, particularly 3 to 15 parts by weight based on 100 parts by weight of the doped silicon oxide.

Meanwhile, the sintering may be performed at 700 to 1,100° C., for example, 800 to 1,000° C. for 1 to 5 hours, taking into account crystallinity of the silicon oxide, the carbon-based binder and the linear conductive material.

Still another embodiment of the present disclosure relates to a negative electrode including the negative electrode active material prepared as described above.

In detail, the negative electrode according to an embodiment of the present disclosure includes a current collector, and a negative electrode active material layer including the negative electrode active material according to the present disclosure on at least one surface of the current collector.

The electrode layer may be formed by coating a slurry for a negative electrode active material layer obtained by dispersing the negative electrode active material according to the present disclosure, a binder and a conductive material in a solvent on at least one surface of the current collector, followed by drying and pressing.

The current collector is not limited particularly if it causes no chemical change in the battery and has conductivity, and may include, for example, copper, stainless steel, aluminum, nickel, titanium, sintered carbon, copper or stainless steel surface-treated with carbon, nickel, titanium or silver, and aluminum-cadmium alloy. The thickness of the current collector is not particularly limited, but may have the thickness of 3~500 μm as commonly applied.

The negative electrode active material shows high initial efficiency because of including the doped silicon oxide, and comprises complex particles wherein the carbon-based binder binds the particles of the doped silicon oxide and the linear conductive material between the particles together to minimize the gaps caused by the volume expansion of silicon oxide, and even though gaps are generated, the linear conductive material serves as a bridge filling the gaps, thereby contributing to improvement of the life characteristics of a battery.

The negative electrode active material may be present in an amount of 80 weight % to 99 weight % based on the total weight of the negative electrode slurry composition.

The binder is a component that aids bonding between the conductive material, and the active material, or the current collector, and is generally present in an amount of 0.1 to 20 weight % based on the total weight of the negative electrode slurry composition. Examples of the binder include polyvinylidene fluoride-co-hexafluoropropylene (PVDF-co-HEP) polyvinylidenefluoride, polyacrylonitrile, polymethylmethacrylate, polyvinylalcohol, carboxylmethylcellulose (CMC), starch, hydroxypropylcellulose, regenerated cellulose, polyvinylpyrrolidone, polytetrafluoroethylene, polyethylene, polypropylene, polyacrylate and styrene butadiene rubber (SBR).

The conductive material is not limited to a particular type if it causes no chemical change in the corresponding battery and has conductivity, and may include, for example, carbon black such as carbon black, acetylene black, ketjen black, channel black, furnace black, lamp black and thermal black; a conductive fiber, for example, a carbon fiber or a metal fiber; fluorocarbon: metal powder, for example, fluorocarbon, aluminum and nickel powder; conductive whisker, for example, zinc oxide, potassium titanate; conductive metal oxide, for example, titanium oxide: and a conductive material, for example, a polyphenylene derivative. The conductive material may be added in an amount of 0.1 to 20 weight % based on the total weight of the negative electrode slurry composition.

The solvent may include an organic solvent, for example, water or N-methyl-2-pyrrolidone (NMP), and may be used in such an amount for the desirable viscosity when the negative electrode slurry includes the negative electrode active material, and optionally, the binder and the conductive material.

Additionally, the coating method of the negative electrode slurry is not limited to a particular type, and includes any coating method commonly used in the art. For example, a coating method using a slot die may be used, and besides, a Meyer bar coating method, a Gravure coating method, a dip coating method, a spray coating method, etc. may be used.

Yet still another embodiment of the present disclosure relates to a lithium secondary battery including the negative electrode. In detail, the lithium secondary battery may be manufactured by injecting an electrolyte containing a lithium salt into an electrode assembly including a positive electrode, the negative electrode as described above, and a separator interposed between.

The positive electrode may be manufactured by mixing a positive electrode active material, a conductive material, a binder and a solvent to prepare a slurry, and directly coating the slurry on a metal current collector, or laminating, on a metal current collector, a positive electrode active material film cast on a separate support and peeled off from the support.

The active material used for the positive electrode is active material particles of any one selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (M1 and M2 are independently any one selected from the group consisting of Al, Ni, Co, Fe, Mn, V, Cr, Ti, W, Ta, Mg and Mo, and x, y and z are independently atomic fractions of elements in the oxide composition, where $0 \le x < 0.5$, $0 \le y < 0.5$, $0 \le z < 0.5$, $0 < x+y+z \le 1$), or their mixtures.

Meanwhile, the conductive material, the binder and the solvent may be the same as those used in manufacturing the negative electrode.

The separator may include a general porous polymer film conventionally used for separators, for example, a porous polymer film made of a polyolefin-based polymer such as ethylene homopolymer, propylene homopolymer, ethylene/butene copolymer, ethylene/hexene copolymer and ethylene/methacrylate copolymer used singly or in stack. Additionally, an insulating thin film having high ion permittivity and mechanical strength may be used. The separator may include a safety reinforced separator (SRS) having a thin coating of a ceramic material on the separator surface. Further, a general porous nonwoven fabric, for example, a nonwoven fabric made of high melting point glass fibers and polyethyleneterephthalate fibers may be used, but is not limited thereto.

The electrolyte solution includes a lithium salt as an electrolyte and an organic solvent for dissolving it.

The lithium salt includes those commonly used in an electrolyte solution for a secondary battery without limitation, and for example, an anion of the lithium salt may include at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent included in the electrolyte solution is not limited to a particular type and may include commonly used types, and may typically include at least one selected from the group consisting of propylene carbonate, ethylene carbonate, diethylcarbonate, dimethylcarbonate, ethylmethylcarbonate, methylpropylcarbonate, dipropylcarbonate, dimethylsulfoxide, acetonitrile, dimethoxyethane, diethoxyethane, vinylenecarbonate, sulfolane, γ-butyrolactone, propylenesulfite and tetrahydrofuran.

Particularly, among the carbonate-based organic solvents, cyclic carbonate such as ethylenecarbonate and propylenecarbonate is an organic solvent with high viscosity and may be preferably used because of allowing favorable dissolution of the lithium salt in the electrolyte by virtue of a high dielectric constant. When such cyclic carbonate is mixed with linear carbonate, which has a low viscosity and a low dielectric constant, such as dimethyl carbonate and diethyl carbonate at a proper ratio, it is possible to form an electrolyte solution having high electrical conductivity.

Optionally, the electrolyte solution according to the present disclosure may further include an additive such as an overcharge inhibitor conventionally included in electrolyte solutions.

The lithium secondary battery according to an embodiment of the present disclosure may be manufactured by interposing the separator between the positive electrode and the negative electrode to form an electrode assembly, putting the electrode assembly in, for example, a pouch, a cylindrical battery case or a prismatic battery case, and injecting the electrolyte. Alternatively, the electrode assembly is stacked and impregnated with the electrolyte solution, and the obtained result is put in the battery case, which in turn, is sealed, bringing the lithium secondary battery into completion.

According to an embodiment of the present disclosure, the lithium secondary battery may be a stack type, a winding type, a stack and folding type or a cable type.

The lithium secondary battery according to the present disclosure may be used in battery cells used as a power source of small devices, and preferably, may be also used in medium- and large-sized devices including a plurality of battery cells. Preferred examples of the medium- and large-sized devices include electric vehicles, hybrid electric vehicles, plug-in hybrid electric vehicles and energy storage systems, and particularly, may be usefully used in hybrid electric vehicles and new renewable energy storage batteries in the area requiring high output.

MODE FOR DISCLOSURE

Hereinafter, examples will be described in detail to provide a further understanding of the present disclosure. However, the examples according to the present disclosure may be modified in many different forms and should not be construed as limited to the examples described below. The examples of the present disclosure are provided to fully explain the present disclosure to those skilled in the art.

Example 1

Manufacture of Negative Electrode Including Doped and Complex-Shaped Complex Particles Step 1: Doping of SiO Particles 100 g of SiO particles having the average particle diameter $D_{50}$ of 1.5 μm and 10 g of magnesium powder having the average particle diameter $D_{50}$ of 5 μm are mixed and put into a chamber, and heat treatment is performed under an Ar atmosphere at 950° C. for 2 hours to dope the SiO particles with magnesium. In this instance, an amount of magnesium doped in SiO is 8 weight %, and the average particle diameter of the obtained magnesium-doped SiO is 1.5 μm as measured using a laser diffraction particle size analyzer (Microtrac MT 3000).

Step 2: Process of Producing Complex Particles 100 parts by weight of the SiO particles doped in the step 1, 10 parts by weight of pitch and 5 parts by weight of CNT are added to the chamber, and sintered under an Ar atmosphere at 850° C. for 3 hours, yielding complex particles in which the doped SiO particles and the CNT are formed into a complex by the medium of a carbon-based binder as a result of sintering the pitch. The average particle diameter $D_{50}$ of the complex particles is 7 μm as measured using a laser diffraction particle size analyzer (Microtrac MT 3000).

Step 3: Manufacture of Negative Electrode

A negative electrode active material obtained by mixing the complex particles obtained in the above step 2 and artificial graphite at a weight ratio of 1:9, carbon black as a conductive material, and carboxymethyl cellulose (CMC) and styrene butadiene rubber (SBR) as binders are mixed at a weight ratio of 95.8:1:1.7:1.5.

28.9 g of distilled water is added to 5 g of the mixture to obtain a slurry for a negative electrode active material layer, and the slurry is applied on a 20 μm thick copper thin film which is a current collector, and then dried. In this instance, in drying, the temperature of circulating air is 60° C. Subsequently, roll pressing is performed, followed by drying in a vacuum oven of 130° C. for 12 hours, and punching in a round shape of 1.4875 cm² to manufacture a negative electrode.

Example 2

Manufacture of Negative Electrode Including Doped and Complex-Shaped Complex Particles Step 1: Doping of SiO Particles 100 g of SiO particles having the average particle diameter $D_{50}$ of 6 μm and 10 g of magnesium powder having the average particle diameter $D_{50}$ of 5 μm are mixed and put into a chamber, and heat treatment is performed under an Ar atmosphere at 950° C. for 2 hours to dope the SiO particles with magnesium. In this instance, an amount of magnesium doped in SiO is 8 weight %, and the average particle diameter of the obtained magnesium-doped SiO is 6 μm as measured using a laser diffraction particle size analyzer (Microtrac MT 3000).

Step 2: Process of Producing Complex Particles 100 parts by weight of the SiO particles doped in the step 1, 10 parts by weight of pitch and 5 parts by weight of CNT are added to the chamber, and sintered under an Ar atmosphere at 850° C. for 3 hours, yielding complex particles in which the doped SiO particles and the CNT are formed into a complex by the medium of a carbon-based binder as a result of sintering the pitch. The average particle diameter $D_{50}$ of the complex particles is 12 μm as measured using a laser diffraction particle size analyzer (Microtrac MT 3000).

Step 3: Manufacture of Negative Electrode

A negative electrode is manufactured by performing the same process as the step 3 of example 1.

Comparative Example 1

Manufacture of Negative Electrode Including Undoped and Noncomplex-Shaped SiO Particles A negative electrode active material obtained by mixing undoped SiO particles having the average particle diameter $D_{50}$ of 1.5 μm and graphite at a weight ratio of 1:9, carbon black as a conductive material, and carboxymethyl cellulose (CMC) and styrene butadiene rubber (SBR) as binders are mixed at a weight ratio of 95.8:1:1.7:1.5.

28.9 g of distilled water is added to 5 g of the mixture to obtain a negative electrode slurry, and the slurry is applied on a 20 μm thick copper thin film which is a current collector, and then dried. In this instance, the temperature of circulating air is 60° C. Subsequently, roll pressing is performed, followed by drying in a vacuum oven of 130° C. for 12 hours, and punching in a circular shape of 1.4875 cm² to manufacture a negative electrode.

Comparative Example 2

Manufacture of Negative Electrode Including Doped and Noncomplex-Shaped SiO Particles Step 1: Doping of SiO Particles 100 g of SiO particles having the average particle diameter $D_{50}$ of 1.5 μm and 10 g of magnesium powder having the average particle diameter $D_{50}$ of 5 μm are mixed and put into a chamber, and heat treatment is performed under an Ar atmosphere at 950° C. for 2 hours to dope the SiO particles with magnesium. In this instance, an amount of magnesium doped in SiO is 8 weight %, and the average particle diameter the obtained magnesium-doped SiO is 1.5 μm as measured using a laser diffraction particle size analyzer (Microtrac MT 3000).

Step 2: Manufacture of Negative Electrode

A negative electrode is manufactured by performing the same process as the step 3 of example 1 using the doped SiO particles.

Comparative Example 3

Manufacture of Negative Electrode Including Undoped Silicon Oxide-Containing Complex Particles Step 1: Process of Producing Complex Particles 100 parts by weight of undoped SiO particles having the average particle diameter $D_{50}$ of 1.5 μm, 10 parts by weight of pitch and 5 parts by weight of CNT are mixed and put into a chamber, and sintered under an Ar atmosphere at 850° C. for 3 hours, yielding complex particles in which the undoped SiO particles and the CNT are formed into a complex by the medium of a carbon-based binder as a result of sintering the pitch. The average particle diameter $D_{50}$ of the complex particles is 7 μm as measured using a laser diffraction particle size analyzer (Microtrac MT 3000).

Step 2: Manufacture of Negative Electrode

A negative electrode is manufactured by performing the same process as the step 3 of example 1 using the complex particles.

Comparative Example 4

Manufacture of Negative Electrode Including Complex Particles Not Containing Linear Nonductive Material Step 1: Doping of SiO Particles 100 g of SiO particles having the average particle diameter $D_{50}$ of 1.5 μm and 10 g of magnesium powder having the average particle diameter $D_{50}$ of 5 μm are mixed and put into a chamber, and the SiO particles are doped with magnesium by heat treatment under an Ar atmosphere at 950° C. for 2 hours. In this instance, an amount of magnesium doped in SiO is 8 weight %, and the average particle diameter of the obtained magnesium-doped SiO is 1.5 μm as measured using a laser diffraction particle size analyzer (Microtrac MT 3000).

Step 2: Process of Producing Complex Particles 100 parts by weight of the SiO particles doped in the step 1 and 10 parts by weight of pitch are added to the chamber, and sintered under an Ar atmosphere at 850° C. for 3 hours, yielding complex particles in which the doped SiO particles are formed into a complex by a carbon-based binder as a resulting of sintering the pitch. The average particle diameter $D_{50}$ of the complex particles is 7 μm as measured using a laser diffraction particle size analyzer (Microtrac MT 3000).

Step 3: Manufacture of Negative Electrode

A negative electrode is manufactured by performing the same process as the step 3 of example 1 using the complex particles.

Comparative Example 5

Manufacture of Negative Electrode Including Complex Particles Not Containing Sintered Carbon-Based Binder Step 1: Doping of SiO Particles 100 g of SiO particles having the average particle diameter $D_{50}$ of 1.5 μm and 10 g of magnesium powder having the average particle diameter $D_{50}$ of 5 μm are mixed and put into a chamber, and heat treatment is performed under an Ar atmosphere at 950° C. for 2 hours to dope the SiO particles with magnesium. In this instance, an amount of magnesium doped in SiO is 8 weight %, and the average particle diameter of the obtained magnesium-doped SiO is 1.5 μm as measured using a laser diffraction particle size analyzer (Microtrac MT 3000).

Step 2: Simple Mixing Process 100 parts by weight of the SiO particles doped in the step 1, 10 parts by weight of pitch and 5 parts by weight of CNT are mixed at room temperature without heat treatment. In this case, it is difficult to measure the average particle diameter due to simple mixing.

Step 3: Manufacture of Negative Electrode

A negative electrode is manufactured by performing the same process as the step 3 of example 1 using the mixture particles.

Experimental Example

Performance Evaluation of Lithium Secondary Battery

Secondary batteries are manufactured by the common method, including the negative electrodes manufactured in examples 1 and 2 and comparative examples 1 to 5, and then charged/discharged. In this instance, charging is performed by applying the current at the current density of 0.1 C-rate up to the voltage of 4.2V, and discharging is performed at the same current density up to the voltage of 2.5V. Such condition of charge/discharge is applied for the first cycle and initial efficiency (%) is measured in the first cycle, and capacity retention (%) is measured during 49 cycles under the condition of 0.5 C-rate.

Initial efficiency (%) and capacity retention (%) are calculated as below, and their values are shown in the following Table 1.

Initial efficiency (%)=(discharge capacity in first cycle/charge capacity in first cycle)×100

Capacity retention (%)=(discharge capacity in 50th cycle/discharge capacity in first cycle)×100

TABLE 1

|  | Composition of negative electrode | Initial efficiency | Life characteristics (capacity retention %) |
| --- | --- | --- | --- |
| Example 1 | Doped SiO/ linear conductive material/ sintered carbon-based binder | 87 | 91 |
| Example 2 | Doped SiO/ linear conductive material/ sintered carbon-based binder | 87 | 87 |
| Comparative example 1 | Undoped SiO | 82 | 69 |

TABLE 1-continued

|  | Composition of negative electrode | Initial efficiency | Life characteristics (capacity retention %) |
|---|---|---|---|
| Comparative example 2 | Doped SiO | 85 | 76 |
| Comparative example 3 | Undoped SiO/ linear conductive material/ sintered carbon-based binder | 83 | 74 |
| Comparative example 4 | Doped SiO/ sintered carbon-based binder | 86 | 80 |
| Comparative example 5 | Doped SiO/ linear conductive material/ unsintered pitch | 84 | 81 |

As can be seen from the above Table 1, the negative electrode manufactured including complex particles obtained from examples 1 and 2 as the negative electrode active material wherein the complex particles are obtained through doping of SiO particles, and forming the doped SiO particles into a complex by sintering the doped SiO particles together with pitch as a carbon-based binder and CNT as a linear conductive material shows better initial efficiency and life characteristics than those of comparative examples 1 to 5 not having undergone any one of the step 2.

What is claimed is:

1. A negative electrode active material for a lithium secondary battery, comprising:
    complex particles comprising:
    silicon oxide particles doped with magnesium;
    a linear conductive material disposed between the doped silicon oxide particles; and
    a carbon-containing binder disposed between the doped silicon oxide particles,
    wherein the carbon-containing binder is in contact with the silicon oxide particles and the linear conductive material at the same time and binds the doped silicon oxide particles and the linear conductive material together,
    wherein the carbon-containing binder comprises a resultant of sintering a carbon-containing precursor, and
    wherein an amount of the magnesium doped in the silicon oxide is 1 weight % to 8 weight % based upon a weight of the silicon oxide.

2. The negative electrode active material for the lithium secondary battery according to claim 1, wherein the silicon oxide is represented by $SiO_x$, wherein $0<x\leq2$.

3. The negative electrode active material for the lithium secondary battery according to claim 1, wherein the doped silicon oxide particles have an average particle diameter of 1 μm to 6 μm.

4. The negative electrode active material for the lithium secondary battery according to claim 1, wherein the complex particles have an average particle diameter of 3 μm to 12 μm.

5. The negative electrode active material for the lithium secondary battery according to claim 1, wherein the carbon-containing precursor comprises pitch.

6. The negative electrode active material for the lithium secondary battery according to claim 1, wherein the carbon-containing binder is present in an amount of 1 part by weight to 30 parts by weight based on 100 parts by weight of the doped silicon oxide.

7. The negative electrode active material for the lithium secondary battery according to claim 1, wherein the linear conductive material comprises carbon nanotube (CNT).

8. The negative electrode active material for the lithium secondary battery according to claim 1, wherein the linear conductive material is present in an amount of 1 part by weight to 30 parts by weight based on 100 parts by weight of the doped silicon oxide.

9. A method for preparing a negative electrode active material for a lithium secondary battery, comprising:
    mixing silicon oxide particles with metal powder of magnesium;
    performing heat treatment to dope the silicon oxide particles;
    mixing the doped silicon oxide particles with a carbon-containing precursor and a linear conductive material; and
    performing sintering to form the doped silicon oxide particles and the linear conductive material into a complex comprising a carbon-containing binder which is a resultant of sintering the carbon-containing precursor,
    wherein an amount of the magnesium doped in the silicon oxide is 1 weight % to 8 weight % based upon a weight of the silicon oxide,
    wherein the heat treatment to dope the silicon oxide particles is performed at a temperature of from 800° C. to 1,050° C.

10. The method according to claim 9, wherein the sintering to form the complex is performed at a temperature of from 700° C. to 1,100° C.

11. A negative electrode comprising:
    a current collector; and
    a negative electrode active material layer disposed on at least one surface of the current collector,
    wherein the negative electrode active material layer includes the negative electrode active material for the lithium secondary battery according to claim 1.

12. A lithium secondary battery comprising the negative electrode according to claim 11.

13. The negative electrode active material for the lithium secondary battery according to claim 1, wherein the linear conductive material has an average diameter of 1 nm to 200 nm and an average length of 100 nm to 5 μm.

14. The negative electrode active material for the lithium secondary battery according to claim 1, wherein the complex particles are 2 to 5 times larger in size than the doped silicon oxide particles,
    wherein the size is defined as an average particle diameter of the complex particles or as an average particle diameter of the doped silicon oxide, and
    wherein a size ratio of the complex particles to the doped silicon oxide particles is calculated by dividing the average particle diameter of the complex particles by the average particle diameter of the doped silicon oxide.

15. The method according to claim 9, wherein the heat treatment to dope the silicon oxide particles is performed for 1 to 3 hours.

16. The method according to claim 9, wherein the sintering to form the complex is performed for 1 to 5 hours.

* * * * *